United States Patent
Johnson, Jr.

(10) Patent No.: US 9,553,517 B2
(45) Date of Patent: Jan. 24, 2017

(54) HYBRID ENERGY STORAGE SYSTEM AND METHODS

(71) Applicant: FLEXGEN POWER SYSTEMS, INC., Houston, TX (US)

(72) Inventor: Robert William Johnson, Jr., Raleigh, NC (US)

(73) Assignee: Fllexgen Power Systems, Inc., Houston, TX (US)

( * ) Notice: Subject to any disclaimer, the term of this patent is extended or adjusted under 35 U.S.C. 154(b) by 392 days.

(21) Appl. No.: 14/190,398

(22) Filed: Feb. 26, 2014

(65) Prior Publication Data

US 2014/0246912 A1     Sep. 4, 2014

Related U.S. Application Data

(60) Provisional application No. 61/771,403, filed on Mar. 1, 2013.

(51) Int. Cl.
| | |
|---|---|
| *H02M 3/15* | (2006.01) |
| *H02M 3/158* | (2006.01) |
| *H02J 7/34* | (2006.01) |

(52) U.S. Cl.
CPC .......... *H02M 3/1584* (2013.01); *H02J 7/345* (2013.01); *Y10T 307/658* (2015.04)

(58) Field of Classification Search
CPC .................................................. H02M 3/1584
USPC .................................. 307/72, 29, 31; 290/31
See application file for complete search history.

(56) References Cited

U.S. PATENT DOCUMENTS

| | | |
|---|---|---|
| 4,992,920 A | 2/1991 | Davis |
| 5,563,802 A | 10/1996 | Plahn et al. |
| 5,734,205 A | 3/1998 | Okamura et al. |
| 5,907,192 A | 5/1999 | Lyons et al. |

(Continued)

FOREIGN PATENT DOCUMENTS

| | | |
|---|---|---|
| DE | 69 707 704 D1 | 11/2001 |
| DE | 69 707 704 T2 | 6/2002 |

(Continued)

OTHER PUBLICATIONS

Kotz R. et al., "Principles and applications of electrochemical capacitors", *Electrochimica Acta*, vol. 45 (2000), pp. 2483-2498.

(Continued)

*Primary Examiner* — Joseph Chang
(74) *Attorney, Agent, or Firm* — Myers Bigel, P.A.

(57) ABSTRACT

A system includes a first DC rail configured to be coupled to a first terminal of a first energy storage device (e.g., a battery), a second DC rail configured to be coupled to a first terminal of a second energy storage device (e.g., an ultracapacitor), and a plurality of converter legs coupled between the first and second DC rails and including at least one first converter leg configured to be coupled to a second terminal of the first energy storage device and at least one second converter leg configured to be coupled to second terminal of the second energy storage device. The system further includes a switch configured to couple and decouple the second terminals of the first and second energy storage devices. The at least one first converter leg and the at least one second converter leg provide different current capacities to deal with differences in power density of the energy storage devices.

19 Claims, 2 Drawing Sheets

(56) References Cited

U.S. PATENT DOCUMENTS

| | | |
|---|---|---|
| 5,929,538 A | 7/1999 | O'Sullivan et al. |
| 6,038,118 A | 3/2000 | Guerra |
| 6,104,102 A * | 8/2000 | Tsuji .................... H02J 9/062 |
| | | 307/31 |
| 6,128,204 A | 10/2000 | Munro et al. |
| 6,175,217 B1 | 1/2001 | Da Ponte et al. |
| 6,252,753 B1 | 6/2001 | Bhargava |
| 6,265,851 B1 | 7/2001 | Brien et al. |
| 6,317,343 B1 | 11/2001 | Okamura et al. |
| 6,703,722 B2 | 3/2004 | Christensen |
| 6,870,279 B2 | 3/2005 | Gilbreth et al. |
| 6,879,053 B1 | 4/2005 | Welches et al. |
| 6,958,550 B2 | 10/2005 | Gilbreth et al. |
| 6,969,922 B2 | 11/2005 | Welches et al. |
| 7,002,260 B2 | 2/2006 | Stahlkopf |
| 7,116,010 B2 | 10/2006 | Lasseter et al. |
| 7,184,903 B1 | 2/2007 | Williams et al. |
| 7,391,126 B2 | 6/2008 | Liu et al. |
| 7,474,016 B2 | 1/2009 | Wang et al. |
| 7,476,987 B2 | 1/2009 | Chang |
| 7,514,808 B2 | 4/2009 | Wobben |
| 7,560,906 B2 | 7/2009 | Liu et al. |
| 7,612,466 B2 | 11/2009 | Skutt |
| 7,642,755 B2 | 1/2010 | Bartilson |
| 7,675,187 B2 | 3/2010 | Woods et al. |
| 7,680,562 B2 | 3/2010 | Delmerico et al. |
| 7,701,087 B2 | 4/2010 | Eckroad et al. |
| 7,781,902 B2 | 8/2010 | Cerney et al. |
| 7,787,272 B2 | 8/2010 | Lasseter et al. |
| 7,834,479 B2 | 11/2010 | Capp et al. |
| 7,855,467 B2 | 12/2010 | Kawazoe et al. |
| 7,906,862 B2 | 3/2011 | Donnelly et al. |
| 7,969,030 B2 | 6/2011 | Woods et al. |
| 8,022,572 B2 | 9/2011 | Vyas et al. |
| 8,080,898 B2 | 12/2011 | Fukuhara |
| 8,099,198 B2 | 1/2012 | Gurin |
| 8,164,217 B1 | 4/2012 | Miller |
| 8,222,756 B2 | 7/2012 | Koeneman et al. |
| 8,227,929 B2 | 7/2012 | Burra et al. |
| 8,315,745 B2 | 11/2012 | Creed |
| 8,338,987 B2 | 12/2012 | O'Brien et al. |
| 8,452,688 B1 | 5/2013 | Sharplin et al. |
| 8,492,913 B2 | 7/2013 | Koeneman et al. |
| 8,532,834 B2 | 9/2013 | Delong et al. |
| 8,558,510 B2 | 10/2013 | Moon |
| 8,688,281 B2 | 4/2014 | Viassolo et al. |
| 8,751,036 B2 | 6/2014 | Darden, II et al. |
| 8,766,474 B2 | 7/2014 | Carralero et al. |
| 8,810,066 B2 | 8/2014 | Moon |
| 8,829,698 B2 | 9/2014 | Koeneman et al. |
| 8,831,788 B2 | 9/2014 | Flynn et al. |
| 8,849,469 B2 | 9/2014 | Belady et al. |
| 8,866,334 B2 | 10/2014 | Donnelly et al. |
| 8,922,056 B2 | 12/2014 | Thisted |
| 8,922,062 B2 | 12/2014 | Johnson et al. |
| 8,938,323 B2 | 1/2015 | Lee |
| 8,946,916 B2 | 2/2015 | Tarnowski |
| 8,946,929 B2 | 2/2015 | Singh et al. |
| 8,975,767 B2 | 3/2015 | Algrain |
| 9,026,259 B2 | 5/2015 | Zadeh et al. |
| 9,026,260 B1 | 5/2015 | Thornley et al. |
| 9,042,141 B2 | 5/2015 | Yu et al. |
| 2002/0017822 A1 | 2/2002 | Umemura et al. |
| 2002/0190525 A1 | 12/2002 | Worden et al. |
| 2002/0198648 A1 | 12/2002 | Gilbreth et al. |
| 2003/0047209 A1 | 3/2003 | Yanai et al. |
| 2003/0080622 A1 | 5/2003 | Koenig |
| 2004/0051387 A1 | 3/2004 | Lasseter et al. |
| 2004/0084965 A1 | 5/2004 | Welches et al. |
| 2004/0240244 A1 | 12/2004 | Yamamoto |
| 2004/0245783 A1 | 12/2004 | Gilbreth et al. |
| 2005/0012395 A1 | 1/2005 | Eckroad et al. |
| 2005/0043859 A1 | 2/2005 | Tsai et al. |
| 2005/0154499 A1 | 7/2005 | Aldridge et al. |
| 2005/0200133 A1 | 9/2005 | Wobben |
| 2006/0192433 A1 | 8/2006 | Fuglevand et al. |
| 2006/0192435 A1 | 8/2006 | Parmley |
| 2007/0024227 A1 | 2/2007 | Kunkel et al. |
| 2007/0182158 A1 | 8/2007 | Cerney et al. |
| 2007/0210652 A1 | 9/2007 | Tracy et al. |
| 2007/0228836 A1 | 10/2007 | Teichmann |
| 2007/0267871 A1 | 11/2007 | Gregory |
| 2008/0088183 A1 | 4/2008 | Eckroad et al. |
| 2008/0203734 A1 | 8/2008 | Grimes et al. |
| 2008/0211230 A1 | 9/2008 | Gurin |
| 2008/0278000 A1 | 11/2008 | Capp et al. |
| 2009/0072623 A1 | 3/2009 | Liao |
| 2009/0086520 A1 | 4/2009 | Nishimura |
| 2009/0140576 A1 | 6/2009 | Yu et al. |
| 2009/0189456 A1 | 7/2009 | Skutt |
| 2009/0195074 A1 | 8/2009 | Buiel |
| 2009/0312885 A1 | 12/2009 | Buiel |
| 2010/0008119 A1 | 1/2010 | O'Brien et al. |
| 2010/0138066 A1 | 6/2010 | Kong |
| 2010/0264739 A1 | 10/2010 | Errington |
| 2010/0270864 A1 | 10/2010 | Vyas et al. |
| 2010/0327800 A1 | 12/2010 | Reineccius |
| 2011/0060474 A1 | 3/2011 | Schmiegel et al. |
| 2011/0062708 A1 | 3/2011 | Prochaska et al. |
| 2011/0068631 A1 | 3/2011 | Roscoe |
| 2011/0080044 A1 | 4/2011 | Schmiegel |
| 2011/0115295 A1 | 5/2011 | Moon et al. |
| 2011/0118894 A1 | 5/2011 | Reineccius et al. |
| 2011/0133558 A1 | 6/2011 | Park |
| 2011/0140520 A1 | 6/2011 | Lee |
| 2011/0140648 A1 | 6/2011 | Lee |
| 2011/0144822 A1 | 6/2011 | Choi |
| 2011/0148195 A1 | 6/2011 | Lee |
| 2011/0148360 A1 | 6/2011 | Lee |
| 2011/0204720 A1 | 8/2011 | Ruiz |
| 2011/0227340 A1 * | 9/2011 | Rozman .................. H02P 27/04 |
| | | 290/31 |
| 2011/0248569 A1 | 10/2011 | Son et al. |
| 2011/0260546 A1 | 10/2011 | Hashizume et al. |
| 2011/0273022 A1 | 11/2011 | Dennis et al. |
| 2011/0309690 A1 | 12/2011 | West |
| 2012/0025614 A1 | 2/2012 | Taimela et al. |
| 2012/0029897 A1 | 2/2012 | Cherian et al. |
| 2012/0033473 A1 | 2/2012 | Scharf |
| 2012/0046798 A1 | 2/2012 | Orthlieb et al. |
| 2012/0068540 A1 | 3/2012 | Luo et al. |
| 2012/0080942 A1 | 4/2012 | Carralero et al. |
| 2012/0089261 A1 | 4/2012 | Kim |
| 2012/0143383 A1 | 6/2012 | Cooperrider et al. |
| 2012/0146412 A1 | 6/2012 | Harrison |
| 2012/0146423 A1 | 6/2012 | Bodewes et al. |
| 2012/0147637 A1 | 6/2012 | Petter |
| 2012/0166013 A1 | 6/2012 | Park et al. |
| 2012/0215368 A1 | 8/2012 | Sharma |
| 2012/0239215 A1 | 9/2012 | Timbus et al. |
| 2012/0267952 A1 | 10/2012 | Ballatine et al. |
| 2012/0283887 A1 | 11/2012 | Goldsmith et al. |
| 2012/0283890 A1 | 11/2012 | Fu et al. |
| 2012/0287690 A1 | 11/2012 | Paatero |
| 2012/0292992 A1 | 11/2012 | Williams |
| 2012/0323396 A1 | 12/2012 | Shelton et al. |
| 2013/0015703 A1 | 1/2013 | Rouse et al. |
| 2013/0035802 A1 | 2/2013 | Khaitan et al. |
| 2013/0641516 | 2/2013 | Rockenfeller et al. |
| 2013/0062953 A1 * | 3/2013 | Nurmi ...................... H02J 3/32 |
| | | 307/72 |
| 2013/0088084 A1 | 4/2013 | Szu |
| 2013/0099581 A1 | 4/2013 | Zhou et al. |
| 2013/0116844 A1 | 5/2013 | McNally et al. |
| 2013/0141956 A1 | 6/2013 | Chiang et al. |
| 2013/0158901 A1 | 6/2013 | Sahinoglu et al. |
| 2013/0166084 A1 | 6/2013 | Sedighy et al. |
| 2013/0169309 A1 | 7/2013 | Bickel |
| 2013/0187454 A1 | 7/2013 | Timbus et al. |
| 2013/0238151 A1 | 9/2013 | Vaum et al. |
| 2013/0241495 A1 | 9/2013 | Min |
| 2013/0285446 A1 | 10/2013 | Chow et al. |
| 2013/0342020 A1 | 12/2013 | Blevins et al. |
| 2014/0025217 A1 | 1/2014 | Jin et al. |

(56) References Cited

U.S. PATENT DOCUMENTS

| | | | |
|---|---|---|---|
| 2014/0032000 A1 | 1/2014 | Chandrashekhara |
| 2014/0058571 A1 | 2/2014 | Hooshmand et al. |
| 2014/0078625 A1 | 3/2014 | Zheng et al. |
| 2014/0084682 A1 | 3/2014 | Covic et al. |
| 2014/0088778 A1 | 3/2014 | Nguyen |
| 2014/0088781 A1 | 3/2014 | Kearns et al. |
| 2014/0097683 A1 | 4/2014 | Piyabongkarn et al. |
| 2014/0100705 A1 | 4/2014 | Shi et al. |
| 2014/0103655 A1 | 4/2014 | Burra et al. |
| 2014/0103724 A1 | 4/2014 | Wagoner |
| 2014/0103855 A1 | 4/2014 | Wolter |
| 2014/0129042 A1 | 5/2014 | Miner |
| 2014/0148960 A1 | 5/2014 | Bhageria et al. |
| 2014/0183949 A1 | 7/2014 | Murano |
| 2014/0188300 A1 | 7/2014 | Nguyen |
| 2014/0191507 A1 | 7/2014 | Holmberg et al. |
| 2014/0200722 A1 | 7/2014 | Bhavaraju |
| 2014/0214223 A1 | 7/2014 | Tsunoda et al. |
| 2014/0217826 A1 | 8/2014 | Oguchi et al. |
| 2014/0225457 A1 | 8/2014 | Elliott, II |
| 2014/0229031 A1 | 8/2014 | Amarin et al. |
| 2014/0249686 A1 | 9/2014 | Brainard et al. |
| 2014/0265596 A1 | 9/2014 | Yuan et al. |
| 2014/0292259 A1 | 10/2014 | Kim et al. |
| 2014/0306533 A1 | 10/2014 | Paquin et al. |
| 2014/0306534 A1 | 10/2014 | Shi et al. |
| 2014/0312882 A1 | 10/2014 | Dong et al. |
| 2014/0324243 A1 | 10/2014 | Markowz et al. |
| 2014/0337002 A1 | 11/2014 | Manto |
| 2014/0375125 A1 | 12/2014 | Ye et al. |
| 2015/0001931 A1 | 1/2015 | Banham-Hall et al. |
| 2015/0008737 A1 | 1/2015 | Mao |
| 2015/0019034 A1 | 1/2015 | Gonatas |
| 2015/0021998 A1 | 1/2015 | Trescases et al. |
| 2015/0032278 A1 | 1/2015 | Bhageria et al. |
| 2015/0039145 A1 | 2/2015 | Yang et al. |
| 2015/0081124 A1 | 3/2015 | Ekanayake et al. |
| 2015/0094871 A1 | 4/2015 | Bhageria et al. |
| 2015/0097437 A1 | 4/2015 | Votoupal et al. |
| 2015/0105931 A1 | 4/2015 | Forbes, Jr. |

FOREIGN PATENT DOCUMENTS

| | | |
|---|---|---|
| DE | 10 2007 005352 A1 | 8/2007 |
| EP | 0 947 042 A1 | 10/1999 |
| EP | 0 947 042 | 10/2001 |
| EP | 2 251 953 A2 | 11/2010 |
| EP | 2 325 970 A2 | 5/2011 |
| EP | 2 330 726 A2 | 6/2011 |
| EP | 2 337 178 A2 | 6/2011 |
| EP | 2 337 184 A2 | 6/2011 |
| EP | 2 339 714 A2 | 6/2011 |
| EP | 2 380 769 A1 | 10/2011 |
| EP | 1 866 717 B1 | 6/2012 |
| GB | 2434928 A | 8/2007 |
| GB | 2434928 B | 4/2010 |
| JP | 2001-507199 A | 5/2001 |
| JP | 2011-109901 A | 6/2011 |
| WO | WO 98/28832 A1 | 7/1998 |
| WO | WO 99/32762 A1 | 7/1999 |
| WO | WO 02/17475 A1 | 2/2002 |
| WO | WO 2004/038892 A2 | 5/2004 |
| WO | WO 2004/054065 A1 | 6/2004 |
| WO | WO 2005/101610 A2 | 10/2005 |
| WO | WO 2006/094128 A2 | 9/2006 |
| WO | WO 2007/018830 A2 | 2/2007 |
| WO | WO 2008/039725 A2 | 4/2008 |
| WO | WO 2008/125696 A2 | 10/2008 |
| WO | WO 2009/128079 | 10/2009 |
| WO | WO 2009/144737 A1 | 12/2009 |
| WO | WO 2010/038152 | 4/2010 |
| WO | WO 2010/042550 A2 | 4/2010 |
| WO | WO 2011/008505 A2 | 1/2011 |
| WO | WO 2011/008506 A2 | 1/2011 |
| WO | WO 2011/020149 A1 | 2/2011 |
| WO | WO 2011/124657 A1 | 10/2011 |
| WO | WO 2012/015508 A1 | 2/2012 |
| WO | WO 2012/064906 A2 | 5/2012 |

OTHER PUBLICATIONS

Nomoto S. et al., "Advanced capacitors and their application", *Journal of Power Sources*, 97-98 (2001), pp. 807-811.
Anwar, et al., Supercapacitor Energy Storage for Low-Voltage Ride Through in a 13.8KV AC System, 2010 IEEE, pp. 189-192.
EPCC Electronic Power Control & Conditioning Module, Jan. 2010, www.nextenergy.org, 6 pages.
IEEE Spectrum: Circuit Could Swap Ultracapacitors for Batteries, http://spectrum.ieee.org/Semiconductors/design/circuit-could-swap-ultracapacitors-for-batter . . . , Jun. 21, 2010, 2 pages.
Ultra Capacitor, Power Conditioning Solutions, Unirom Electronics Ltd., www.unirom.co.il, Printed Jun. 18, 2010, 8 pages.
Unirom Electronics Presentation, Semicon Japan 2008, pp. 1-30.

\* cited by examiner

HYBRID ENERGY STORAGE SYSTEM AND METHODS

RELATED APPLICATIONS

The present application claims priority to U.S. Provisional Patent Application No. 61/771,403, filed Mar. 1, 2013 and entitled HYBRID ENERGY STORAGE SYSTEM AND METHODS, the disclosure of which is incorporated herein by reference in its entirety.

BACKGROUND

The inventive subject matter relates to power converter devices and methods of operating the same and, more particularly, to converter devices for use with energy storage devices, such as batteries and capacitors.

Electro-mechanical and electronic systems are commonly powered by energy storage devices, such as a batteries and capacitors. Such energy storage devices may have different performance characteristics. For example, high energy density storage devices such as batteries may provide relatively high storage capacity and desirable output voltage characteristics, but may be undesirably limited in the rate at which they can be charged and discharged. High power density storage devices such as ultracapacitors may be capable of relatively high charge and discharge rates, but may have limited capacity and undesirable voltage characteristics.

SUMMARY

In certain embodiments of the inventive subject matter, a multi-phase converter may be used to combine two energy sources that have different characteristics and voltage ranges, such as a battery and an ultracapacitor.

Some embodiments provide a system including a converter comprising three legs coupled between first and second DC rails, a first energy storage device having a first terminal coupled to the first DC rail and a second terminal coupled to a first one of the converter legs and a second energy storage device having a first terminal coupled to the second DC rail and a second terminal coupled to second and third ones of the converter legs. The system further includes a switch configured to couple and decouple the second terminals of the first and second energy storage devices. The first energy storage device may include at least one battery and the second energy storage device may include at least one capacitor. The system may further include a diode coupled between the first and second energy storage devices and in parallel with the switch.

Further embodiments provide a system including a plurality of converter legs coupled between first and second DC rails, at least one battery having a first terminal coupled to the first DC rail and a second terminal coupled to at least one first converter leg of the plurality of converter legs, and at least one capacitor having a first terminal coupled to the second DC rail and a second terminal coupled to at least one second converter leg of the plurality of converter legs. The system further includes a switch configured to couple and decouple the second terminals of the at least one capacitor and the at least one battery. The at least one second converter leg may provide a greater current capacity than the at least one first converter leg. For example, the at least one second converter leg may include at least two converter legs and the at least one first converter leg may be a single converter leg. The system may further include a diode coupled in parallel with the switch.

Still further embodiments provide a system including a first DC rail configured to be coupled to a first terminal of a first energy storage device, a second DC rail configured to be coupled to a first terminal of a second energy storage device, and a plurality of converter legs coupled between the first and second DC rails and including at least one first converter leg configured to be coupled to a second terminal of the first energy storage device and at least one second converter leg configured to be coupled to second terminal of the second energy storage device. The system further includes a switch configured to couple and decouple the second terminals of the first and second energy storage devices. The at least one first converter leg and the at least one second converter leg may provide different current capacities. For example, the at least one first converter leg may include a different number of converter legs than the at least one second converter leg, e.g., the at least one second converter leg may include at least two converter legs and the at least one first converter leg may be a single converter leg.

DETAILED DESCRIPTION

Figure 1:
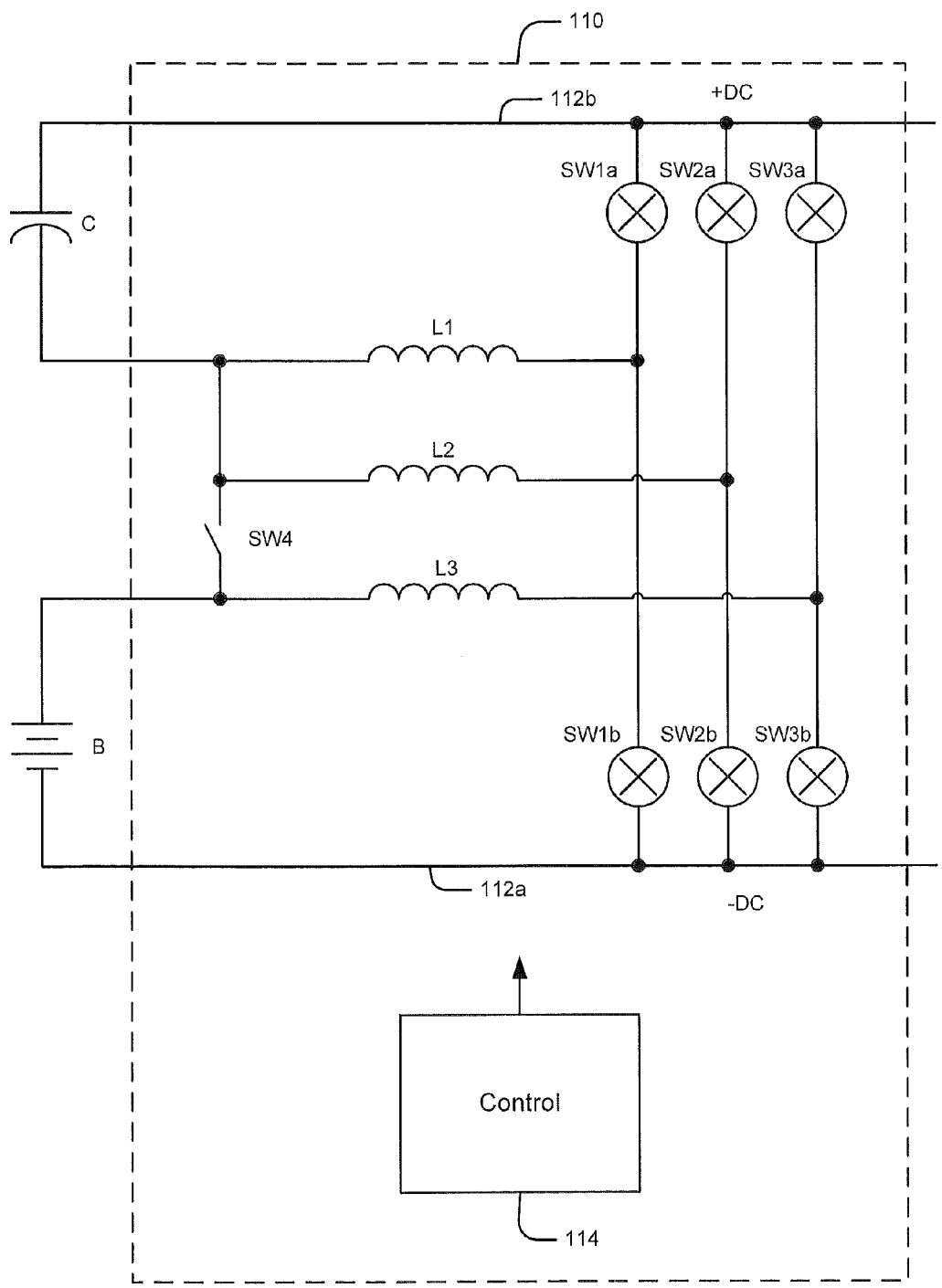
FIG. 1 illustrates a power converter apparatus according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

A 3-phase converter may have 5 terminals; positive, negative buses (rails) and 3 phase outputs (legs). The sources of power can be a battery (Li-Ion or Ni—Zn chemistries) and an ultracapacitor bank. The voltage ranges of each are varied and not easily integrated. For example a Li-Ion battery may have a charge voltage of 3.2V/cell and discharge termination voltage of 2.7V/cell. However, an ultracapacitor may store energy as the square of the voltage. The discharge voltage may have a 50% voltage swing to extract 75% of the stored energy. The voltages are so different that it may be difficult to easily combine the storage devices with the same converter. It also may be desirable to provide an operational mode that allows discharge of the ultracapacitors independent of the battery. The ultracapacitor may be discharged first to supply and/or absorb load transients. When the load transient exceeds the capability of the ultracapacitors, the battery may be used.

FIG. 1 shows the connections of battery B and ultracapacitor bank C energy storage devices to a 3-phase converter 110 that includes three half-bridge phase legs that include first switches SW1a, SW2a, SW3a and second switches SW1b, SW2b, SW3b coupled between first and second DC rails 112a, 112b. The battery B has a terminal connected to the negative DC rail 112a and the ultracapacitor bank C has a terminal connected to the positive DC rail 112b. The three phase legs are coupled to the energy sources by respective inductors L1, L2, L3, with one inductor L3 connected to the battery and two of the inductors L1, L2 connected to the ultracapacitor bank. A SW4 (e.g. a relay or similar device) provides a switchable connection between the positive terminal of the battery B and the negative terminal of the ultracapacitor bank C.

In some applications, the DC rails 112a, 112b may be connected to a three-phase inverter that is connected to an AC grid or other AC load. The DC rail voltage may vary over a wide range and serve as the input for the inverter. For example, if the inverter is configured to produce a 415V, 3-phase output, the DC rail voltage may vary from 925V to 600V. The ultracapacitor bank voltage may require, for example, a voltage swing from 750V to 375V to enable extraction of 75% of the available energy. The battery voltage may require, for example, a swing from 600V to 480V for Li-Ion chemistry. The inductors L1, L2, L3 and converter legs SW1a, SW1b, SW2a, SW2b, SW3a, SW3b may be operated as boost converters to maintain the DC rail voltages as the voltages of the ultracapacitors C and battery B vary. The switches SW1a, SW1b, SW2a, SW2b, SW3a, SW3b, SW4 may be controlled by a control circuit 114 responsive to various control inputs, such as a voltage of one or both of the DC rails 112a, 112b, a voltage of the battery B and/or the ultracapacitor bank C, a current delivered to a load coupled to one or both of the DC rails 112a, 112b, and the like.

The connections of the various energy storage types with the DC rails 112a, 112b allows independent control of the storage voltages and various advantageous operating modes. When additional energy is required to supply the load demand, the ultracapacitor bank C may be discharged first. For example, the DC rails 112a, 112b may be maintained at or near the upper level of 925V as the ultracapacitor bank C is discharged. As the ultracapacitors C are discharged, the voltage of the ultracapacitor bank C will fall. The use of two legs of the converter to discharge the ultracapacitors bank may provide additional current carrying capability to deal with the increase in current as the converter 110 operates to maintain the rail voltage as the ultracapacitor bank voltage falls.

Eventually, the sum of the ultracapacitor bank voltage and the battery voltage may equal the desired DC rail voltage. When this occurs, the switch SW4 may be closed to connect the negative terminal of the ultracapacitor bank C to the positive terminal of the battery B. With the switch SW4 closed, all three of the converter legs SW1a, SW1b, SW2a, SW2b, SW3a, SW3b may be used to maintain the DC rail voltage from both of the energy storage devices and support the load for a long term. After the switch SW4 is closed, the DC rail voltage can be allowed to fall as the pair of sources is further discharged, which can enable a deeper discharge of the ultracapacitor bank C.

When the load is reduced, the energy storage devices may be recharged. The switch SW4 may be opened and each energy storage device may be recharged independently. If there is limited excess energy, priority may be give to the ultracapacitor bank C, i.e., the short term energy storage device. It may be charged first and/or at a faster rate than the battery B, which may be facilitated by the additional current capability provided by the multiple legs SW1a, SW1b, SW2a, SW2b connected to the ultracapacitor bank. The battery B may be charged later and/or at a lower rate. The voltages selected can be adjusted without adversely impacting the operating modes.

In further embodiments, an inductor could be connected in series with the switch SW4 to allow control of the magnitude and duration of the inrush current through the switch SW4 based on circuit elements and the difference voltage.

Figure 2:
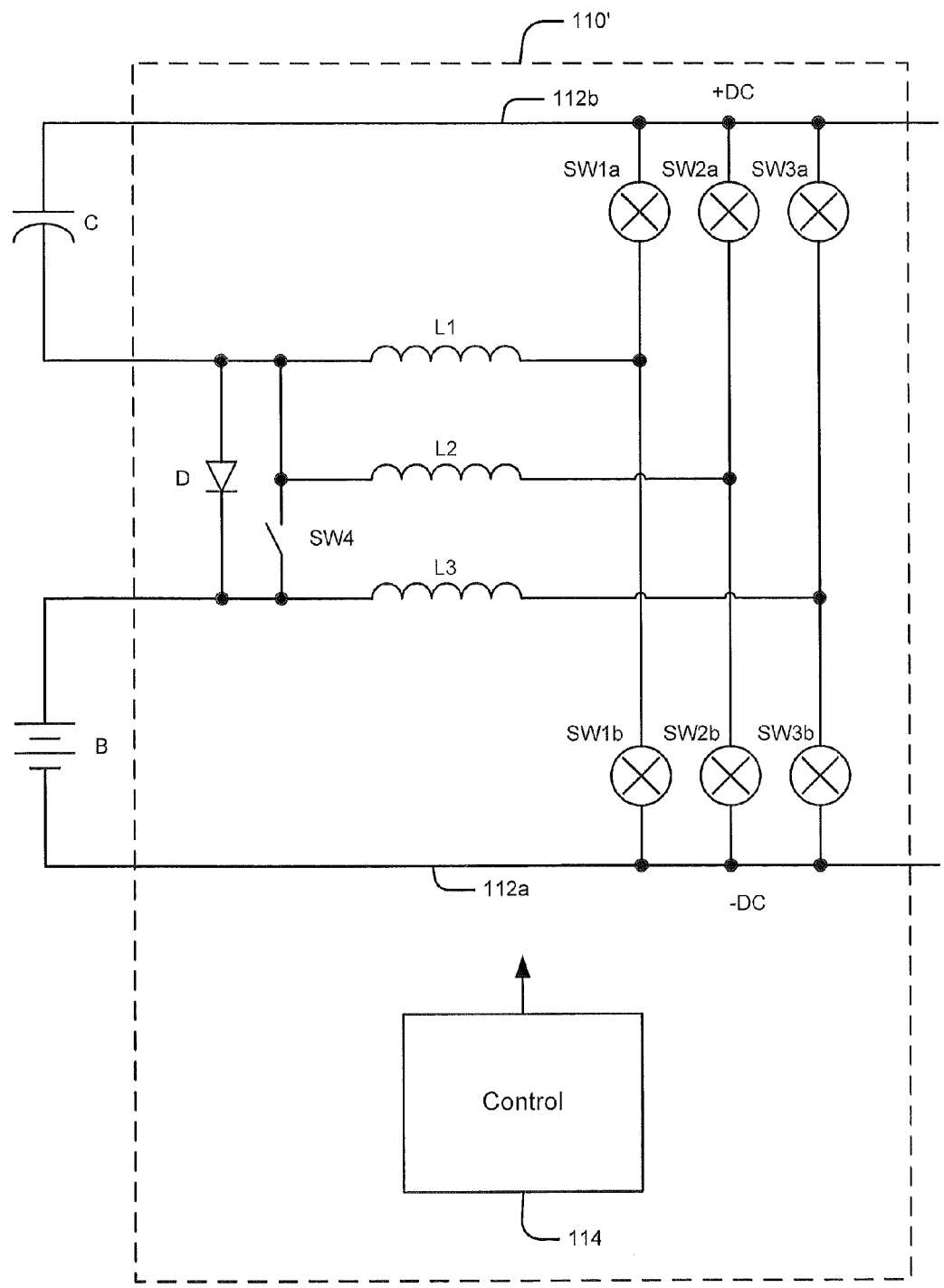
FIG. 2 illustrates a power converter apparatus according to further embodiments.

In still further embodiments shown in FIG. 2, in a converter 110', a diode D may be added between the ultracapacitor bank and the battery with the anode connected to the ultracapacitor bank. Inrush current may be limited if the DC rail voltage is sufficiently greater than the sum of the ultracapacitor and battery voltages to forward bias the diode D. This may allow the switch SW4 to be closed with reduced inrush current. This may require control actions by the converter 110'. In particular, the converter 110' may be used to force forward conduction of the diode D by trying to raise the rail voltage above the sum of the battery and ultracapacitor bank voltages.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed is:

1. A system comprising:
    a converter comprising three legs coupled between first and second DC rails;
    a first energy storage device having a first terminal coupled to the first DC rail and a second terminal coupled to a first one of the converter legs;
    a second energy storage device having a first terminal coupled to the second DC rail and a second terminal coupled to second and third ones of the converter legs; and
    a switch configured to couple and decouple the second terminals of the first and second energy storage devices.

2. The system of claim 1, wherein the first energy storage device comprises at least one battery and wherein the second energy storage device comprises at least one capacitor.

3. The system of claim 1, wherein each of the three legs comprises first and second switches coupled in a half-bridge configuration.

4. The system of claim 1, wherein the switches operate responsive to a voltage of the first and second DC rails.

5. The system of claim 1, further comprising a diode coupled between the first and second energy storage devices and in parallel with the switch.

6. A system comprising:
a plurality of converter legs coupled between first and second DC rails;
at least one battery having a first terminal coupled to the first DC rail and a second terminal coupled to at least one first converter leg of the plurality of converter legs;
at least one capacitor having a first terminal coupled to the second DC rail and a second terminal coupled to at least one second converter leg of the plurality of converter legs; and
a switch configured to couple and decouple the second terminals of the at least one capacitor and the at least one battery.

7. The system of claim 6, wherein the at least one second converter leg provides a greater current capacity than the at least one first converter leg.

8. The system of claim 6, wherein the at least one second converter leg comprises at least two converter legs and wherein the at least one first converter leg is a single converter leg.

9. The system of claim 6, wherein each of the three legs comprises first and second switches coupled in a half-bridge configuration.

10. The system of claim 6, wherein the switches operate responsive to a voltage of the first and second DC rails.

11. The system of claim 6, further comprising a diode coupled in parallel with the switch.

12. A system comprising:
a first DC rail configured to be coupled to a first terminal of a first energy storage device;
a second DC rail configured to be coupled to a first terminal of a second energy storage device;
a plurality of converter legs coupled between the first and second DC rails and including at least one first converter leg configured to be coupled to a second terminal of the first energy storage device and at least one second converter leg configured to be coupled to second terminal of the second energy storage device; and
a switch configured to couple and decouple the second terminals of the first and second energy storage devices.

13. The system of claim 12, wherein the at least one first converter leg and the at least one second converter leg provide different current capacities.

14. The system of claim 12, wherein the at least one first converter leg comprises a different number of converter legs than the at least one second converter leg.

15. The system of claim 14, wherein the at least one second converter leg comprises at least two converter legs and wherein the at least one first converter leg is a single converter leg.

16. The system of claim 12, further comprising the first and second energy storage devices.

17. The system of claim 16, wherein the first energy storage device comprises at least one battery and wherein the second energy storage device comprises at least one capacitor.

18. The system of claim 12, wherein the switches operate responsive to a voltage of the first and second DC rails.

19. The system of claim 12, further comprising a diode coupled in parallel with the switch.

* * * * *